Oct. 12, 1937.　　　　F. C. FRANK　　　　2,095,805
DISK BRAKE
Filed Nov. 25, 1935
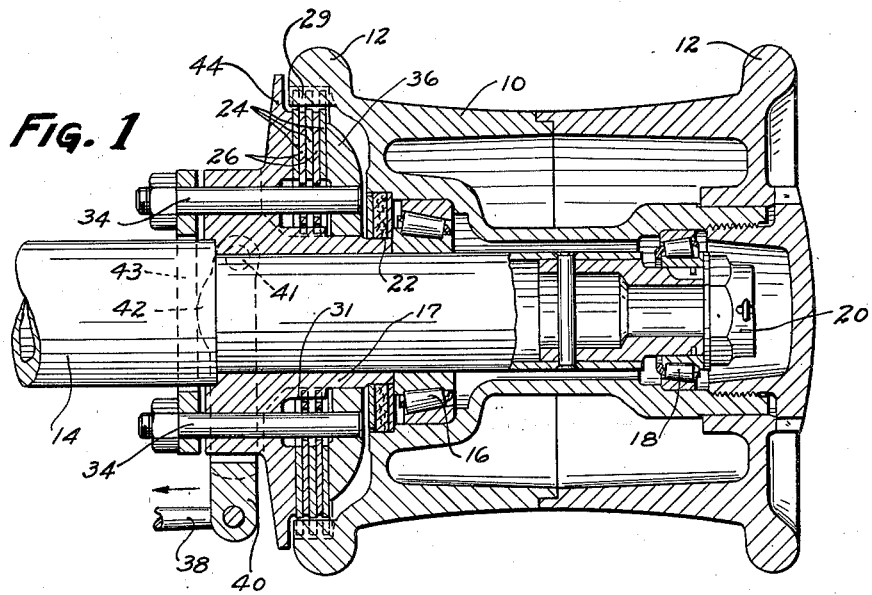
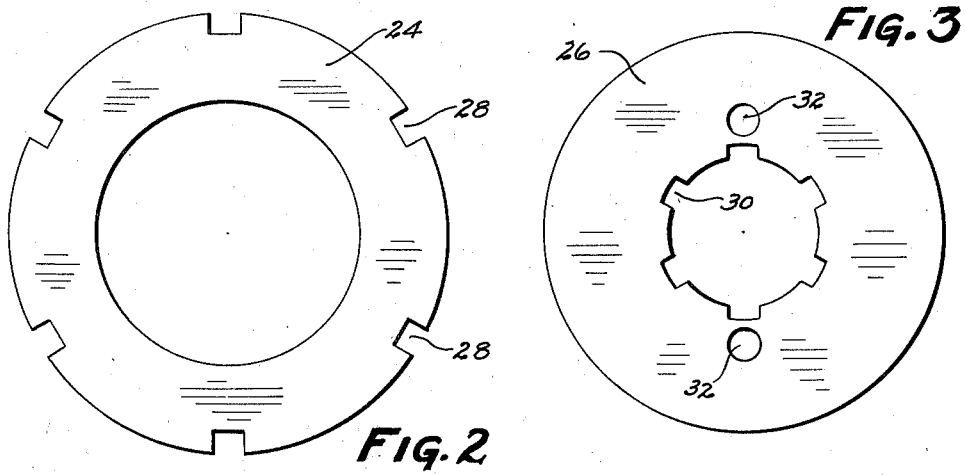
INVENTOR.
FREDERICK C. FRANK
BY　*A. E. Wilson*
ATTORNEY Patented Oct. 12, 1937

2,095,805

UNITED STATES PATENT OFFICE 2,095,805

DISK BRAKE

Frederick C. Frank, South Bend, Ind., assignor to Bendix Products Corporation, South Bend, Ind., a corporation of Indiana Application November 25, 1935, Serial No. 51,436

5 Claims. (Cl. 188—18)

This invention relates to brakes and more particularly to disk brakes having a plurality of stationary and rotatable metal disks fixed to the axle member and the wheel and adapted to be moved into engagement with each other to exert a braking force to decelerate a vehicle.

In the operation of disk brakes it has been customary to employ a plurality of disks of hardened steel to effect the deceleration of the vehicle. In the operation of brakes of this type considerable difficulty has been experienced because of the fact that when the brake is applied considerable frictional heat is generated, and the braking effort results in rather high pressures on the disks which cause the free carbon in the disks to effect a fusing action between the various disks, so that the stationary and rotatable disks are fused into a solid mass of material upon cooling. The wheel then becomes locked and it is impossible to use the structure until new disks have been inserted in the brakes.

An object of this invention is therefore to provide a disk brake particularly adapted for use with aircraft wherein fusing of the disks of the brake when subjected to high operating temperature and pressure is prevented.

Another object of this invention is to provide a disk brake having alternate disks of hardened steel and graphitic steel adapted to prevent a fusing action from taking place between the various disk members when subjected to high temperature and pressure.

A further object of the invention is to provide a disk brake having high carbon heat treated steel disks to give good wearing surfaces, and graphitic heat treated disks to provide good wearing surfaces and to resist abrasion to avoid scoring the disks of the brake.

Another object of the invention is to provide a disk brake having heat treated stationary graphitic steel disks fixed to the axle of the vehicle, and rotatable high carbon heat treated steel disks carried by the wheel structure and interposed between the graphitic steel disks.

A still further object of the invention is to provide an aircraft disk brake which may be positioned within the hub of the wheel, and provided with alternate disks of hardened steel and graphitic steel designed to absorb a great quantity of frictional heat without causing a fusing action to take place between the successive disks of the brake.

A further object of the invention is to provide a disk brake designed particularly for use with aircraft wheels of the low pressure type, which may be manufactured economically, which are designed to dissipate a great quantity of heat, which may be so positioned with reference to the structure of the wheel to be streamlined therewith, and which may be so positioned as not to interfere with the rigidifying members of the wheel.

Other objects and advantages of the invention will be apparent from the following detailed description, considered in connection with the accompanying drawing submitted for purposes of illustration only and not intended to define the scope of the invention, reference being had for that purpose to the subjoined claims.

In the drawing wherein similar reference characters refer to similar parts throughout the several views:

Figure 1 is a vertical sectional view through an airplane wheel equipped with a disk brake embodying the present invention;

Figure 2 is an end view of the rotatable disk carried by the wheel; and

Figure 3 is an end view of the fixed disk.

Referring more particularly to Figure 1 there is shown an airplane wheel having a body section 10 equipped with tire engaging segments 12 designed to receive and hold a tire on the wheel. The wheel is rotatably mounted on an axle 14, being separated therefrom by roller bearing members 16 and 18 interposed between the inner surfaces of the wheel and the axle, and adapted to permit free rotation of the wheel. Positioned on the axle 14 between a shoulder formed thereon and the bearing 16 is a member 17 arranged to support the brake. The wheel is held on the axle 14 by means of a nut 20 engaging the end of the axle 14. The inner end of the roller bearing 16 is sealed by means of a felt washer 22 designed to prevent lubrication from the bearings from escaping inwardly along the outer surfaces of the sleeve 17.

A disk brake having rotatable hardened steel high carbon disks 24, and stationary heat treated graphitic steel disks 26 is positioned in the inner end of the wheel 10. The rotatable disks 24 are provided with a plurality of transversely extending slots 28 on the outer periphery adapted to move longitudinally internal splines or guides 29 formed on the inner surface of the body section 10 of the wheel. The stationary graphitic steel disks 26 are slidably mounted on the sleeve 17 by means of transversely extending slots 30 engaging splines 31 formed on member 17. The stationary disks 26 are provided with diametrically opposed apertures 32 adapted to receive actuating rods 34. The inner end of the rods 34 is fixed in a pressure plate 36 adapted to engage the surface of one of the rotatable disks 24 to compress the disks together when the actuating mechanism comprising the manually operable link 38, the yoke 40, and the cam 42 are moved to compress the disks 24 and 26 between the pressure plate 36 and a cooperating plate 44 of member 17.

The rotatable disks 24 are formed of a steel having a carbon content of approximately .75 to 1.25%, and small quantities of chromium, vanadium and magnesium. This material is heat treated to form a ductile disk having good wearing qualities. The steel used in these disks has a consistency similar to the steel used in the making of saws.

The graphitic disk may be formed of a steel having in the neighborhood of 1.5 to 1.7% carbon, 1 to 1.2% silicon, .3 to .5% manganese, .01 to .02% phosphorus and .01 to .02% sulphur. This steel will absorb approximately .90% carbon in the eutectic stage, without any tendency for free graphite to separate out. A portion of the balance of the carbon content will show up in the form of free graphite. The silicon content, of course, has considerable bearing on the amount of carbon which will show up in the form of free graphite, and generally speaking, the higher the silicon content, the higher the percentage of free graphite will be, and the percentage of combined carbon will correspondingly decrease. This steel may be heat treated to reduce the free graphite to provide a disk having good wearing characteristics to prevent abrasion and to avoid scoring of the disks.

Attention is directed to the fact that when the brake is applied and the graphitic and high carbon steel disks are urged into engagement with each other, the presence of free graphite in the graphitic disk operates as a lubricant to prevent a fusing action between the disks when subjected to high temperature and pressure resulting from a severe application of the brakes. The similar metals of the cooperating disks, that is the graphitic and the steel disks, function to retard the fusing action, when the cooperating disks are subjected to high temperature and pressure, due to a severe braking application.

The operation of this brake is as follows: To apply the brakes the operator moves a manually operable control (not shown), thereby moving the link 38 in the direction indicated by the arrow on Figure 1, to rotate the yoke 40 about the pin 41, thereby urging the cam 42 into engagement with the annular member 43, to exert tension on the rods 34 which operate through the pressure plate 36 to urge the rotatable and non-rotatable disks 24 and 26 into engagement with each other to effect a braking action on the wheel 10.

It will be observed that the rotatable disks 24 are so proportioned that they overlie the rods 34, and that the stationary disk 26 is so proportioned as to lie inside of the splined section 28 of the wheel.

This structure is such that it may be manufactured economically and provides a disk brake which may be practically fully enclosed within the wheel, thereby lending itself well to streamlining the wheel structure.

Although in the description of this invention it has been stated that the graphitic disk is the stationary member, and the high carbon disk the rotatable member, it is to be understood that this relation may be reversed, the high carbon disk being stationary and the graphitic disk being rotated.

While the invention has been described with particular reference to a preferred embodiment, it is to be understood that various changes may be made in the particular structure and in the chemical composition of the disks to provide a non-locking disk brake, reference being had to the following claims to define the scope of this invention.

I claim:

1. In an airplane wheel a wheel structure, an axle, a splined section carried by the wheel structure, a sleeve having a splined section between the wheel and the axle, a plurality of high carbon steel disks slidably mounted in the splined section of the wheel and rotatable therewith, a plurality of stationary graphitic steel disks slidably mounted on the splined sleeve and positioned intermediate the high carbon steel disks, and means including a manually operable member to urge the disks into engagement with each other.

2. In a wheel an axle, a sleeve having a splined section carried by the wheel, a wheel structure having an internally splined section positioned on the axle and supported by said sleeve, high carbon splined steel disks slidably mounted in the internally splined section of the wheel, graphitic steel disks slidably mounted on the splined sleeve and alternately spaced with respect to the high carbon disks, means including tension members extending through the graphitic stationary disks, and lying within the rotatable high carbon disks to urge the high carbon and graphitic disks into engagement.

3. In an airplane wheel an axle, a sleeve having a splined section carried by the wheel, a wheel structure having an internally splined section positioned on the axle and supported by said sleeve, high carbon splined steel disks slidably mounted in the internally splined section of the wheel, graphitic steel disks slidably mounted on the splined sleeve and alternately spaced with respect to the high carbon disks, means including tension members extending through the graphitic stationary disks, and lying within the rotatable high carbon disks to urge the high carbon and graphitic disks into engagement, the graphitic disk comprising approximately 1.5 to 1.7% carbon, 1 to 1.2% silicon, .3 to .5% manganese, .01 to .02% phosphorus, .01 to .02% sulphur, the hardened steel disk comprising approximately .75 to 1.25% carbon and small quantities of chromium, vanadium and magnesium heat treated to give good wearing characteristics.

4. A steel disk for a disk brake comprising approximately 1.5 to 1.7% carbon, 1 to 1.2% silicon, .3 to .5% manganese, .01 to .02% phosphorus, .01 to .02% sulphur, the disk having approximately .7% of free graphite.

5. An airplane disk brake comprising a stationary support member, a series of disks slidably mounted on the support, a second series of disks separating the disks and support of the first series slidably mounted in a rotating member, and means to compress the disks into frictional engagement, one of said series of disks formed of graphitic steel, and the other series formed of a steel of relatively high carbon content.

FREDERICK C. FRANK.